Dec. 27, 1955     W. E. O'SHEI     2,728,244
CRANK FITTINGS
Filed July 14, 1952
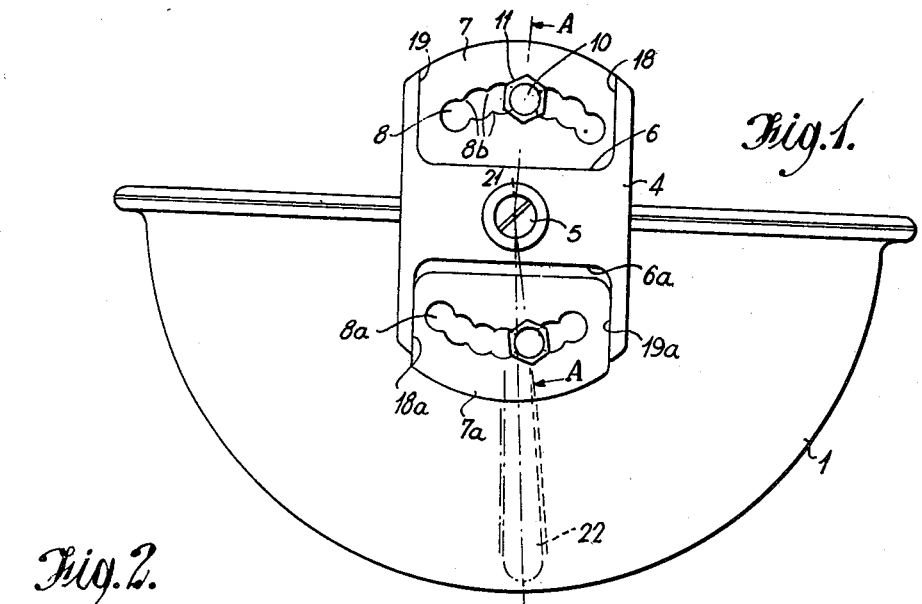
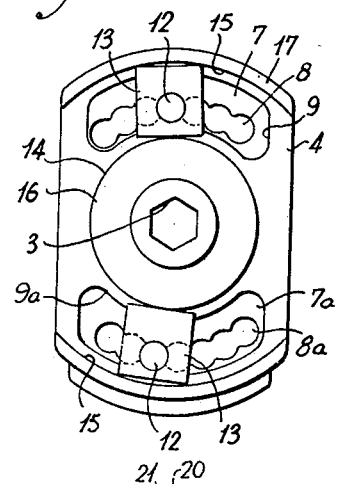
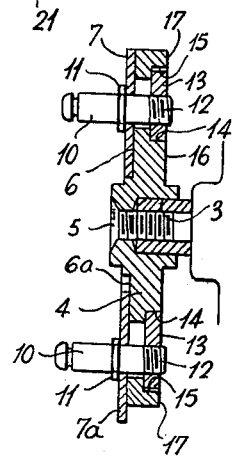
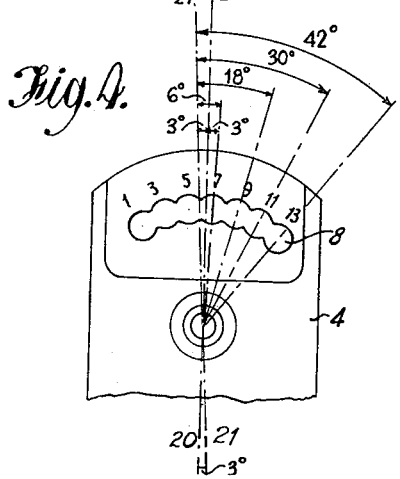
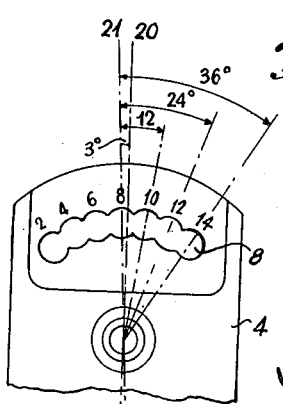
Inventor
William E. O'Shei
By Emery Holcombe & Blair
Attorney

United States Patent Office 2,728,244
Patented Dec. 27, 1955

2,728,244

CRANK FITTINGS

William Edward O'Shei, London, England

Application July 14, 1952, Serial No. 298,737

Claims priority, application Great Britain July 17, 1951

9 Claims. (Cl. 74—522)

Windscreen wiper motors are usually coupled to drive plural wiper blades through a crank fitting, generally comprising a pair of crank pins, at the end of the motor shaft. These crank fittings vary according to the requirements for different cars, and therefore a stockist of replacement motors has to carry a stock of several motors with different crank fittings in order to meet all the requirements which may be placed upon him.

It has been previously proposed to make the crank fittings detachable from the motor shaft so that a common motor may, by the attachment of a suitably selected crank fitting, be adapted to meet the different requirements. This, however, necessitates the stockist carrying a large stock of crank fittings if he is to meet all requirements.

It has also been proposed to mount a crank pin on a disc or segment which can be rotated around the axis of the motor shaft to adjust the angular relationship of the crank pin relative to the motor shaft, the disc or segment being frictionally held in the adjusted position by a holding screw. With such arrangements there is a risk that the setting of the crank pin may change during operation of the wiper system, since the crank pin is not positively held in its adjusted position.

The present invention has for its object to provide a universal crank fitting in which the crank pins can be adjusted to any of a plurality of positions in order to meet different requirements, and be positively secured in the selected position against movement.

According to the present invention, the crank fitting comprises a plate-like member adapted to be fitted to the motor shaft of a windscreen wiper motor with its plane normal to the axis of the said shaft, said plate member being provided with an elongated slot having at least one of the longitudinal edges of the slot being provided with a plurality of notches, projections or the like and a crank pin which is adapted to be fitted at different points along the slot and interlocked with the notches, projections or the like so that movement of the crank pin within the slot from its selected position is positively prevented. The locating projections or notches are so arranged that the crank pin will be located in different positions in the slot corresponding to the desired angular relationship thereof with respect to the motor shaft.

Preferably two such slots are provided in the plate member at opposite sides of the motor shaft so that each of two crank pins at opposite sides of the shaft may be independently adjusted to the desired relative position. The slots are preferably curved with their centres of curvature approximately at the axis of the motor shaft.

In a preferred form, the slot is formed corresponding to a plurality of partly overlapping circular holes so that each edge of the slot will be of wavy form, the portion of the crank pin which is adapted to fit within the slot having a diameter approximately equal to that of a hole so that it will fit in different positions along the slot corresponding to the centres of the holes and be prevented from longitudinal movement in the slot. The crank pin may be secured in the selected position in any convenient manner, for example by a nut screwed on to the threaded end of a shank portion of the crank pin which projects through the slot.

According to a feature of the invention, the or each slot is formed in an auxiliary plate member (one for each slot) which is separate from the member (hereinafter called the "main member") adapted to be fitted to the motor shaft, said auxiliary plate member or members being adapted to be secured to the main member in either of two or more positions, whereby the number of positions in which the associated crank pin may be located will be increased. Thus, for example, an auxiliary plate member may be secured to the main member at different distances from the axis of the motor shaft whereby the radius at which the crank pin oscillates may be adjusted, the angular position of the crank pin relative to the motor shaft being adjustable by selecting the position in the slot at which the crank pin is secured. Alternatively, or in addition, an auxiliary plate member may be secured to the main member in either of two positions in which the ends of the slot are reversed, for example with either one or other of its surfaces facing outwardly from the main member, whereby, by appropriate selection of the disposition of the locating positions of the slot in the auxiliary plate member, different angular positions for the crank pin relative to the motor shaft can be obtained by reversing the position of the slot.

The auxiliary plate members are secured to the main member in such a manner that their positions are positively located.

Preferably the means for securing an auxiliary plate member to the main member also serve for securing the crank pin in the selected location in the slot. For example, an auxiliary plate member may be adapted to fit in a corresponding recess in the surface of the main member and be secured therein when a nut is screwed onto the end of the threaded shank of the crank pin which passes through the slot in the plate member and a correspondingly positioned aperture in the main member, the nut bearing against the rear surface of the main member. The crank pin may be provided with a shoulder portion or collar intermediate its ends, which shoulder or collar bears on the front surface of the auxiliary plate member to hold the latter in assembled position when the nut is tightened.

The plate members are preferably reversible in the recesses and the plate members and recesses are preferably so shaped that a plate member can be moved in its recess in a radial direction towards and away from the motor shaft. Means are provided for positively locking the plate at the selected radial distance and this is achieved, according to a feature of the invention, by constructing the nut which screws on to the threaded shank of the crank pin, or an associated washer, in such manner that in cooperation with associated locating means or guides on the main member, the radial distances at which the chrank pin will be positioned will be determined by the location of the nut or the associated washer.

One embodiment according to the invention is illustrated in the accompanying drawings, in which:

Figure 1 shows a front view of the crank fitting according to this invention mounted on the shaft of a wiper motor of the oscillating paddle type;

Figure 2 is a rear view of the crank fitting.

Figure 3 is a section along the line A—A in Figure 1, the motor being omitted except for the end part of the motor shaft.

Figures 4 and 5 are diagrams for explaining the modes of adjusting the positions of the crank pins.

Referring to the drawings, 1 is a conventional windscreen wiper motor of the oscillating paddle type of which the driving shaft 2 is formed with its end of hexagonal cross-section adapted to fit in a hexagonal recess 3 in the back of the main member 4 of the crank fitting and be positively held on the shaft by a screw 5 extending into a threaded bore in the motor shaft.

The main member 4 is formed with two shallow recesses 6, 6a adapted respectively to receive two auxiliary plate members 7, 7a respectively, each of substantially rectangular shape with a curved outer edge and each formed with a curved slot 8, 8a comprising a plurality of overlapping circular holes, seven holes being shown in the drawing. The plate members may be made from sheet metal, such as sheet steel, and the slots may be formed by drilling a plurality of overlapping holes in the plate member or they can be produced by a punching operation by using a suitably shaped punch and die.

The portions of the main member 4 lying behind the slots 8 in the auxiliary plates are cut away to form apertures 9, 9a of larger size than the slots 8, 8a in an auxiliary plate member. Each auxiliary plate member is held in position in its recess 6 by means of a crank pin 10 which is formed with a shoulder 11 at a point intermediate its ends, the outer end forming the crank pin proper and the shank portion 12 passing through the slot 8 and having its end threaded and screwed into a nut 13 bearing against the back surface of the main member 4. The nut 13 is of approximately rectangular form and is fitted between two parallel guide surfaces 14, 15 formed respectively by the side walls of a central boss 16 and a peripheral flange 17. The nut is thus prevented from rotating at the back of the main member whilst it can be moved in the guides to a position behind any part of the slot in the plate member. The shoulder 11 is made hexagonal or provided with flats or other means for enabling the shank to be turned, for example by a spanner, to screw the shank into the nut.

The shank 11 is made of a diameter corresponding to the maximum width of the slot 8 so that when inserted through one of the seven overlapping holes forming a slot, it will be locked against longitudinal movement in the slot by reason of the adjacent projecting portions 8b. Thus to select any desired angular position of a crank pin relative to the motor shaft, it is only necessary to insert the shank of the crank pin through the appropriate one of the overlapping holes and to screw it into the nut 13 at the back of the main member. This simultaneously holds the auxiliary plate member in position in its recess 6, the walls 18, 19 of the recess preventing movement of the auxiliary plate member in the longitudinal direction of its slot whilst the nut and its cooperating guide surfaces 14, 15 prevent movement of the auxiliary plate member in the radial direction. The crank pin is also prevented from moving in the slot as above described and hence its position is positively located.

It will be seen from Figures 2 and 3 that the threaded aperture in the nut 13 is offset from the centre of the nut in the radial direction so that by reversing the position of the nut from that shown in the upper part of Figure 2 to that shown in the lower part of Figure 2, the radial distance of the threaded aperture from the motor shaft will be increased. Thus, the radial distance of the crank pin from the motor shaft will depend upon the orientation of the nut. In both positions of the nut it is restrained against radial movement by the guide surfaces 14, 15. The auxiliary plate member is movable in its recess to positions corresponding to the different radii, for which purpose the side edges of the plate member and the associated side walls 18, 19 of the recess are parallel. When the crank pin is positioned at the greater radial distance from the motor axis, the inner edge of the auxiliary plate will, as shown in the case of the lower plate member 8a in Figure 1, be spaced away from the corresponding edge of the recess. However, the plate member is locked against movement by its side edges engaging the side walls 18a, 19a of the recess and by the nut being located by its guide surfaces 14, 15.

The holes forming a slot may be positioned at angular spacings of 12° relative to the shaft axis, the central hole of each slot being positioned at an angle of 3° with respect to the centre line 20—20 of the main member. The hexagonal recess 2 in the back of the main member is so positioned therein that the centre line 20—20 of the main member will make an angle of 3° with respect to radial direction 21—21 of the motor paddle 22. Thus as shown in Figure 4, the central aperture of the slot will be displaced 6° with respect to the motor paddle and each of the other apertures will be displaced at multiples of 12° with respect to the central aperture, i. e. at angles of 18°, 30° and so on with respect to the paddle. By reversing the outwardly facing surface of the plate member, it occupies the position shown in Figure 5, in which the central hole of the slot will be in alignment with the motor paddle and the other apertures will be at angles of 12°, 24° and so on with respect to the paddle. Thus by reversing the auxiliary plate members, all angles, with 6° spacings, up to the limit defined by the length of the slot, can be achieved. The apertures are preferably numbered with odd numbers on one side of the plate and with even numbers on the other side of the plate, as shown, to facilitate the selection of any desired angular relationship between the crank pins and relative to the motor shaft by reference to a chart. Further the radial position of the crank pin may be changed to either of two radial distances as above described.

Whilst a particular embodiment has been described, it will be understood that various modifications may be made without departing from the scope of the invention. Thus the nut 13 may be replaced by a rectangular washer having an aperture offset from its centre as described for the nut 13, in which case the nut itself may be a conventional hexagonal nut which screws on to the threaded end of the shank 11 which extends through the washer. The radial position of the crank pin may be adjusted by reversing the position of the washer. In a further modification the washer may be provided with two partly overlapping holes into which the shank of the crank pin can be selectively fitted to determine its radial position, without reversing the position of the nut.

I claim:

1. A crank fitting for a windscreen wiper motor comprising a plate-like member, means for fitting the plate-like member to the motor shaft with its plane normal to the axis of said shaft, said plate-like member being provided with two elongated slots disposed at opposite sides of the means for fixing the plate-like member to the motor shaft, at least one of the longitudinal edges of each slot being provided with a plurality of projections, two crank pins adapted respectively to be fitted at different points along each of the slots and interlocked with the projections so that movement of a crank pin longitudinally within its slot from its selected position is positively prevented, means for securing the crank pins in their selected positions, and means for changing the radial distance of each slot from the axis of the motor shaft.

2. A crank fitting for a windscreen wiper motor comprising a plate-like member, means for fitting the plate-like member to the motor shaft with its plane normal to the axis of said shaft, said plate-like member being provided with two elongagted slots disposed at opposite sides of the means for fixing the plate-like member to the motor shaft, said slots being curved with their centres of curvature approximately at the axis of the motor shaft, each slot being formed from a plurality of partly overlapping circular holes so that each edge of the slot will be of wavy form, two crank pins adapted respectively to be fitted at different points along each of the slots, the portions of the crank pins which are adapted to fit within the slots having a diameter approximately equal to that of a hole so that each crank pin will fit in different positions along its slot corresponding to the centres of the holes and be prevented from longitudinal movement in the slot, means for securing the crank pin in the selected position, and means for changing the radial distance of each slot from the axis of the motor shaft.

3. A crank fitting for a windscreen wiper motor comprising a main member, means for fitting said main member to the motor shaft, a first auxiliary plate member carried from said main member with its surface in a plane normal to the axis of the motor shaft, a second auxiliary plate member carried from said main member with its surface in a plane normal to the axis of the motor shaft, a slot in each of said auxiliary plate members, said slots being spaced away from the axis of the motor shaft and disposed respectively at opposite sides of said motor shaft, at least one of the longitudinal edges of each of the slots being provided with a plurality of projections, guide means cooperating between each of said auxiliary plate members and the main member to permit guided movement of said auxiliary plate members relative to the main member in directions towards and away from the axis of the motor shaft, a first crank pin adapted to be fitted at different points along the slot in said first auxiliary plate member and interlocked with the projections thereof, a second crank pin adapted to be fitted at different points along the slot in said second auxiliary plate member and interlocked with the projections thereof, means for securing each crank pin in its selected position in its slot, and means for securing each auxiliary plate member in at least two positions on the main member with its slot at different distances from the axis of the shaft.

4. A crank fitting as claimed in claim 3, wherein each of said slots is formed of a plurality of partly overlapping circular holes so that each edge of a slot will be of wavy form, the portion of each crank pin which is adapted to fit within a slot having a diameter approximately equal to that of a hole so that it will fit in different positions along the slot corresponding to the centres of the holes and be prevented from longitudinal movement in the slot.

5. A crank fitting as claimed in claim 4, wherein each of said slots is of curved form with its centre of curvature approximately at the axis of the motor shaft.

6. A crank fitting for a windscreen wiper motor comprising a main plate member, means for fitting said main plate member to the motor shaft with its plane normal to the axis of said shaft, a first recess formed in the front surface of said main plate member at one side of the axis of the motor shaft, said recess having two side walls arranged substantially parallel to a radius passing through the axis of the motor shaft, a first auxiliary plate member fitted within said first recess and having two side edges arranged substantially parallel to one another and spaced apart by a distance corresponding to the distance between the side walls of said first recess, a first elongated slot in said first auxiliary plate member, said first slot being curved with its centre of curvature approximately at the axis of the motor shaft, said first slot being formed by a plurality of partly overlapping circular holes so that each edge of said first slot will be of wavy form, a second recess formed in the front surface of said main plate member at a position substantially diametrically opposite to said first recess, said second recess having two side walls arranged substantially parallel to one another and extending substantially parallel to said radius, a second auxiliary plate member fitted within said second recess and having two side edges arranged substantially parallel to one another and spaced apart by a distance corresponding to the distance between the side walls of said second recess, a second elongated slot in said second auxiliary plate member, said second slot being curved with its centre of curvature approximately at the axis of the motor shaft, said second slot being formed by a plurality of partly overlapping circular holes so that each edge of said second slot will be of wavy form, two apertures in said main plate member disposed respectively behind said first and second slots and having a width greater than that of said slots, a central boss of circular form disposed between said apertures on the rear surface of said main plate member, concentric flanges on the rear surface of said main member and disposed outside said apertures, two crank pins, each crank pin having a collar intermediate its ends, one end of each said crank pin having a threaded shank portion with a diameter approximately equal to that of a hole of the slot of an auxiliary plate member, said shank portions of the two crank pins passing respectively through a hole of the slot in one of the two auxiliary plate members, and extending into an associated locating member positioned between the central boss and a concentric flange to locate the radial distance of the crank pin from the axis of the motor shaft, and means for securing the crank pins in position and simultaneously holding the auxiliary plate members respectively in their associated recesses.

7. A crank fitting as claimed in claim 6, wherein each locating member slidably fits, without rotating, between the central boss and a concentric flange and is provided with an aperture into which extends the shank portion of the associated crank pin, said aperture being positioned away from the point on the locating member which is disposed midway between the central boss on the concentric flange, and said locating member being reversible between the central boss and the concentric flange to change the distance by which said aperture is spaced from the axis of the motor shaft.

8. A crank fitting as claimed in claim 7, wherein the aperture in a locating member is threaded to receive the thread on the shank portion of a crank pin and thus serve as the means for securing the crank pin in position.

9. A crank fitting as claimed in claim 6, wherein the holes of the slot in an auxiliary plate member are disposed asymmetrically with reference to the centre line of the auxiliary plate member, said auxiliary plate member being reversible in its recess.

References Cited in the file of this patent

UNITED STATES PATENTS

| | | |
|---|---|---|
| 363,522 | Knous | May 24, 1887 |
| 2,566,843 | Lappin | Sept. 4, 1951 |
| 2,608,707 | Oishei | Sept. 2, 1952 |
| 2,693,118 | Krohm | Nov. 2, 1954 |